(12) United States Patent
Gervais

(10) Patent No.: US 11,041,644 B2
(45) Date of Patent: Jun. 22, 2021

(54) METHOD AND ENVIRONMENT CONTROLLER USING A NEURAL NETWORK FOR BYPASSING A LEGACY ENVIRONMENT CONTROL SOFTWARE MODULE

(71) Applicant: Distech Controls Inc., Brossard (CA)

(72) Inventor: Francois Gervais, Lachine (CA)

(73) Assignee: DISTECH CONTROLS INC., Brossard (CA)

( * ) Notice: Subject to any disclaimer, the term of this patent is extended or adjusted under 35 U.S.C. 154(b) by 358 days.

(21) Appl. No.: 15/981,368

(22) Filed: May 16, 2018

(65) Prior Publication Data

US 2019/0353366 A1    Nov. 21, 2019

(51) Int. Cl.

| | |
|---|---|
| *G05B 21/00* | (2006.01) |
| *G01M 1/38* | (2006.01) |
| *G05B 13/00* | (2006.01) |
| *G05B 15/00* | (2006.01) |
| *G05D 23/00* | (2006.01) |
| *F24F 11/30* | (2018.01) |
| *G05B 13/02* | (2006.01) |
| *F24F 11/54* | (2018.01) |

(Continued)

(52) U.S. Cl.
CPC .............. *F24F 11/30* (2018.01); *F24F 11/54* (2018.01); *F24F 11/57* (2018.01); *F24F 11/64* (2018.01); *F24F 11/65* (2018.01); *G05B 13/027* (2013.01); *F24F 2110/10* (2018.01); *F24F 2110/20* (2018.01); *F24F 2110/70* (2018.01); *F24F 2120/12* (2018.01); *F24F 2120/20* (2018.01)

(58) Field of Classification Search
CPC .. F24F 11/30; F24F 11/54; F24F 11/57; F24F 11/64; F24F 11/65; F24F 2110/10; F24F 2110/20; F24F 2110/70; F24F 2120/12; F24F 2120/20; F24F 11/56; F24F 11/77; G05B 13/027

See application file for complete search history.

(56) References Cited

U.S. PATENT DOCUMENTS 5,121,467 A * 6/1992 Skeirik ............... G05B 13/029
706/10
5,268,834 A * 12/1993 Sanner ............... G05B 13/047
700/31

(Continued)

*Primary Examiner* — Zhipeng Wang
(74) *Attorney, Agent, or Firm* — RatnerPrestia

(57) ABSTRACT

Method and environment controller using a neural network for bypassing a legacy environment control software module. The environment controller receives at least one environmental characteristic value and determines a plurality of input variables. At least one of the plurality of input variables is based on one among the at least one environmental characteristic value. The environment controller transmits the plurality of input variables to an inference server executing a neural network inference engine. The environment controller receives at least one inferred output variable from the inference server. The environment controller uses the at least one inferred output variable received from the inference server in place of at least one output variable calculated by the legacy environment control software module based on the plurality of input variables. The environment controller may prevent the execution of the legacy software module or overwrite the output variable(s) calculated by the legacy software module.

11 Claims, 11 Drawing Sheets

(51) Int. Cl.
*F24F 11/57* (2018.01)
*F24F 11/64* (2018.01)
*F24F 11/65* (2018.01)
*F24F 120/20* (2018.01)
*F24F 110/10* (2018.01)
*F24F 110/20* (2018.01)
*F24F 110/70* (2018.01)
*F24F 120/12* (2018.01)

(56) References Cited

U.S. PATENT DOCUMENTS

| | | | | |
|---|---|---|---|---|
| 5,282,261 | A * | 1/1994 | Skeirik | G05B 13/027 |
| | | | | 700/44 |
| 6,078,843 | A * | 6/2000 | Shavit | G05B 13/027 |
| | | | | 700/42 |
| 9,046,881 | B2 * | 6/2015 | Blevins | G05B 17/02 |
| 9,529,348 | B2 * | 12/2016 | Kephart | G05B 19/41885 |
| 10,481,565 | B2 * | 11/2019 | Crncich-DeWolf | ......... |
| | | | | G05B 13/0265 |
| 2007/0129917 | A1 * | 6/2007 | Blevins | G05B 19/0428 |
| | | | | 703/6 |
| 2015/0319942 | A1 * | 11/2015 | Thomas | A01G 25/16 |
| | | | | 239/1 |
| 2016/0018126 | A1 * | 1/2016 | Kolk | F24F 11/70 |
| | | | | 700/278 |
| 2016/0098037 | A1 | 4/2016 | Zornio et al. | |
| 2017/0124088 | A1 * | 5/2017 | Lu | G06F 16/248 |
| 2018/0113482 | A1 * | 4/2018 | Vitullo | G05D 23/1917 |
| 2018/0187913 | A1 * | 7/2018 | Kolk | F24F 11/64 |
| 2019/0264943 | A1 * | 8/2019 | Gagnon | G06N 3/02 |

* cited by examiner

METHOD AND ENVIRONMENT CONTROLLER USING A NEURAL NETWORK FOR BYPASSING A LEGACY ENVIRONMENT CONTROL SOFTWARE MODULE

TECHNICAL FIELD

The present disclosure relates to the field of environment control systems. More specifically, the present disclosure relates to a method and an environment controller using a neural network for bypassing a legacy environment control software module.

BACKGROUND

Systems for controlling environmental conditions, for example in buildings, are becoming increasingly sophisticated. A control system may at once control heating and cooling, monitor air quality, detect hazardous conditions such as fire, carbon monoxide release, intrusion, and the like. Such control systems generally include at least one environment controller, which receives measured environmental characteristic values, generally from external sensors, and in turn determines set points or command parameters to be sent to controlled appliances.

For instance, a room has current environmental characteristic values, such as a current temperature and a current humidity level, detected by sensors and reported to an environment controller. A user interacts with the environment controller to provide set point(s), such as a target temperature and/or a target humidity level. The environment controller sends the set point(s) to a controlled appliance (e.g. a heating, ventilating, and/or air-conditioning (HVAC) appliance). The controlled appliance generates commands for actuating internal components (of the controlled appliance) to reach the set point(s). Alternatively, the environment controller directly determines command(s) based on the set point(s) and transmits the command(s) to the controlled appliance. The controlled appliance uses the command(s) received from the environment controller to actuate the internal components to reach the set point(s). Examples of internal components include a motor, an electrical circuit (e.g. for generating heat), a valve (e.g. for controlling an air flow), etc.

The environment controller executes one or more software module for controlling the environmental conditions in an area. A given software module has a plurality of input variables and one or more output variable. The input variables can be based on environmental characteristic values transmitted by sensors, set point(s) provided by end users, etc. The one or more output variable is used to generate command(s) sent to a controlled appliance. The software module may use various techniques for generating the output variable(s) based on the input variables, such as a mathematical formula, an algorithm, a rule engine, a combination thereof, etc.

Current advances in artificial intelligence, and more specifically in neural networks, can be taken advantage of. More specifically, a predictive model taking into consideration the plurality of input variables to infer the one or more output variable, can be generated and used by a neural network. The neural network technology is used in place of the corresponding legacy environment control software module (originally used for calculating the one or more output variable based on the plurality of input variables).

The advantage of the neural network technology is that it is more resilient to changes and unexpected conditions than a traditional software module.

However, in some cases, it may be useful to keep the legacy environment control software module and provide the capability to use the neural network technology in a non-disruptive manner. For example, the environment controller could be configured to use either one of the legacy environment control software module or the neural network technology based on specific needs.

Therefore, there is a need for a new method and environment controller using a neural network for bypassing a legacy environment control software module.

SUMMARY

According to a first aspect, the present disclosure relates to an environment controller. The environment controller comprises a communication interface and a processing unit. The processing unit receives at least one environmental characteristic value via the communication interface. The processing unit determines a plurality of input variables. At least one of the plurality of input variables is based on one among the at least one environmental characteristic value. The processing unit transmits via the communication interface the plurality of input variables to an inference server executing a neural network inference engine. The processing unit receives via the communication interface at least one inferred output variable from the inference server. The processing unit uses the at least one inferred output variable received from the inference server in place of at least one output variable calculated by a legacy environment control software module based on the plurality of input variables.

According to a second aspect, the present disclosure relates to a method for bypassing a legacy environment control software module via a neural network. The method comprises receiving at least one environmental characteristic value via a communication interface of an environment controller. The method comprises determining by a processing unit of the environment controller a plurality of input variables. At least one of the plurality of input variables is based on one among the at least one environmental characteristic value. The method comprises transmitting by the processing unit via the communication interface the plurality of input variables to an inference server executing a neural network inference engine. The method comprises receiving by the processing unit via the communication interface at least one inferred output variable from the inference server. The method comprises using by the processing unit the at least one inferred output variable received from the inference server in place of at least one output variable calculated by the legacy environment control software module based on the plurality of input variables.

According to a third aspect, the present disclosure relates to a non-transitory computer program product comprising instructions executable by a processing unit of an environment controller. The execution of the instructions by the processing unit provides for bypassing a legacy environment control software module via a neural network by implementing the aforementioned method.

In a particular aspect, the environment controller may prevent the execution of the legacy environment control software module or overwrite the output variable(s) calculated by the legacy environment control software module.

BRIEF DESCRIPTION OF THE DRAWINGS

Embodiments of the disclosure will be described by way of example only with reference to the accompanying drawings, in which.

DETAILED DESCRIPTION

Figure 1:
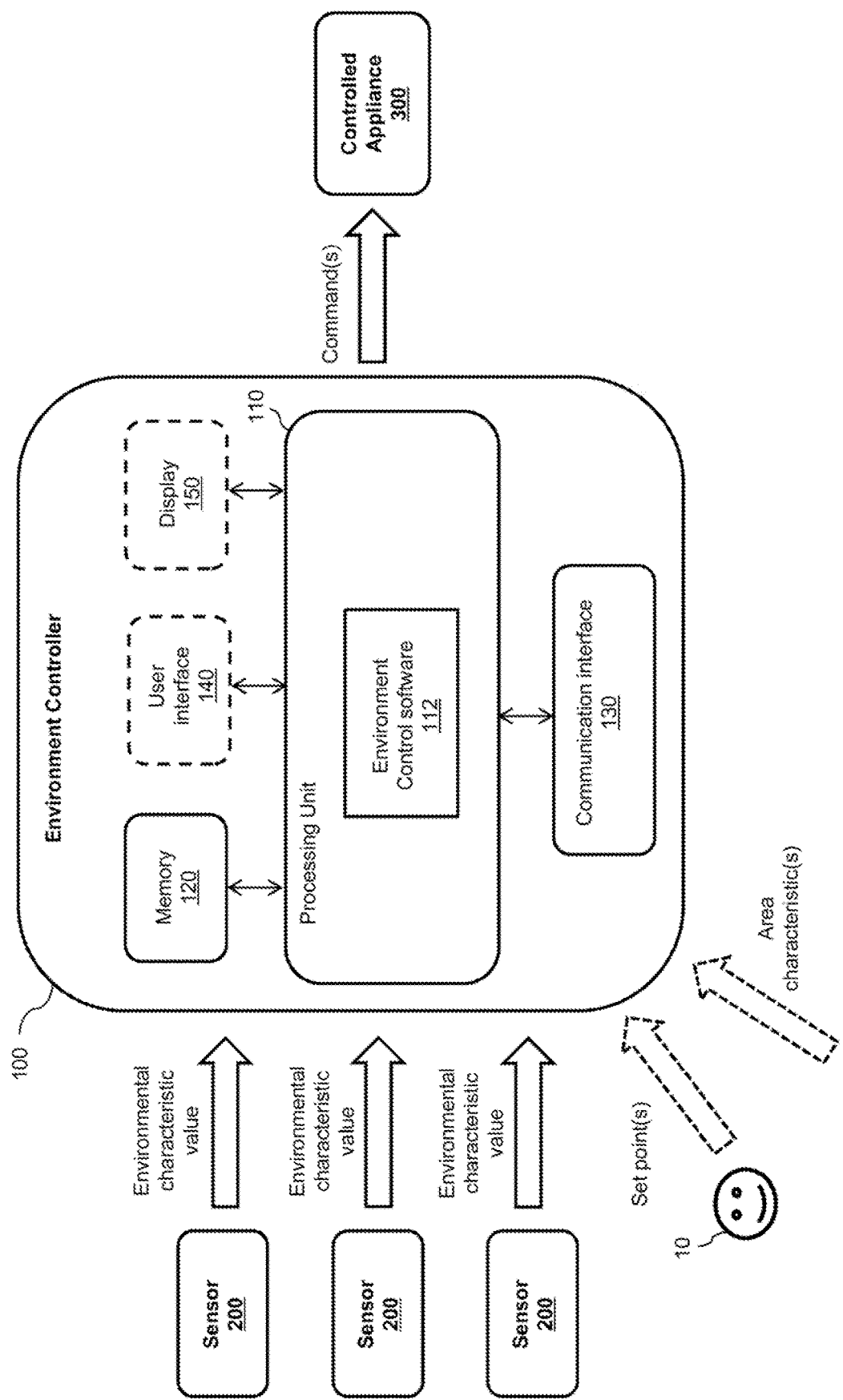
FIG. 1 illustrates an environment controller capable of controlling an appliance based on environmental characteristic values received from sensors.

The foregoing and other features will become more apparent upon reading of the following non-restrictive description of illustrative embodiments thereof, given by way of example only with reference to the accompanying drawings.

Various aspects of the present disclosure generally address one or more of the problems related to the replacement of a legacy environment control software module (executed by an environment controller) by Artificial Intelligence means, such as a neural network. More specifically, the present disclosure describes a smooth transition path allowing to use the neural network in place of the legacy environment control software module with minimal impact on the software executed by the environment controller.

Terminology

The following terminology is used throughout the present disclosure:

Environment: condition(s) (temperature, humidity, pressure, oxygen level, carbon dioxide level, light level, security, etc.) prevailing in a controlled area or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Environmental state: a current condition of an environment based on an environmental characteristic, each environmental state may comprise a range of values or verifiable representation for the corresponding environmental characteristic.

VAV appliance: A Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Area of a building: The expression 'area of a building' is used throughout the present specification to refer to the interior of a whole building or a portion of the interior of the building such as, without limitation: a zone, a floor, a room, an aisle, etc.

Environment Controller without AI Means

Referring now concurrently to FIGS. 1, 2, 3 and 6, an environment controller 100 (represented in FIGS. 1 and 2), an environment control software module 112' (represented in FIG. 3) and an environment control method (represented in FIG. 6) are illustrated.

The environment controller 100 comprises a processing unit 110, memory 120, a communication interface 130, optionally a user interface 140, and optionally a display 150. The environment controller 100 may comprise additional components not represented in FIG. 1 for simplification purposes.

The processing unit 110 comprises one or more processor (not represented in FIG. 1) capable of executing instructions of a computer program. Each processor may further comprise one or several cores.

The memory 120 stores instructions of computer program(s) executed by the processing unit 110, data generated by the execution of the computer program(s), data received via the communication interface 130, data received via the optional user interface 140, etc. Only a single memory 120 is represented in FIG. 1, but the environment controller 100 may comprise several types of memories, including volatile memory (such as a volatile Random Access Memory (RAM), etc.) and non-volatile memory (such as a hard drive, electrically-erasable programmable read-only memory (EEPROM), etc.).

The communication interface 130 allows the environment controller 100 to exchange data with several devices (e.g. one or more sensor 200, one or more controlled appliance 300, etc.) over one or more communication network (not represented in FIG. 1 for simplification purposes). The term communication interface 130 shall be interpreted broadly, as supporting a single communication standard/technology, or a plurality of communication standards/technologies. Examples of communication interfaces 130 include a wireless (e.g. Wi-Fi, cellular, wireless mesh, etc.) communication module, a wired (e.g. Ethernet) communication module, a combination of wireless and wired communication modules, etc. In an exemplary configuration, the communication interface 130 of the environment controller 100 has a first wireless (e.g. Wi-Fi) communication module for exchanging data with the sensor(s) and the controlled appliance(s), and a second wired (e.g. Ethernet) communication module for exchanging data with other computing devices not represented in FIG. 1 for simplification purposes. The communication interface 130 usually comprises a combination of hardware and software executed by the hardware, for implementing the communication functionalities of the communication interface 130.

The steps of the method 500 are implemented by the environment controller 100, to generate command(s) for controlling the controlled appliance 300 based on environment characteristic values received from the sensors 200.

A dedicated computer program has instructions for implementing the steps of the method 500. The instructions are comprised in a non-transitory computer program product (e.g. the memory 120) of the environment controller 100. The instructions, when executed by the processing unit 110 of the environment controller 100, provide for generating command(s) for controlling the controlled appliance 300 based on environment characteristic values received from the sensors 200. The instructions are deliverable to the environment controller 100 via an electronically-readable media such as a storage media (e.g. CD-ROM, USB key, etc.), or via communication links (e.g. via a communication network through the communication interface 130).

Figure 2:
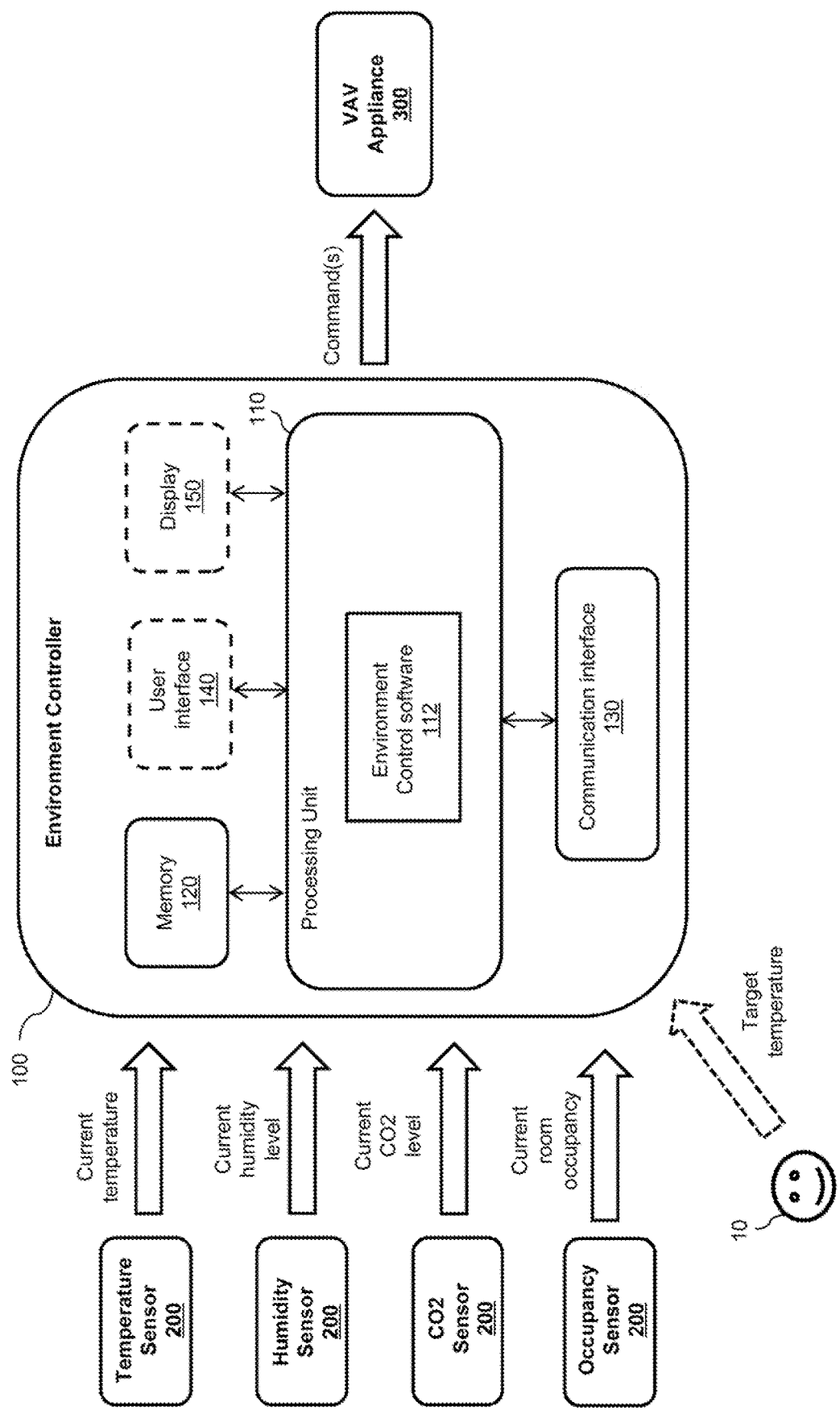
FIG. 2 illustrates an exemplary environment control system where the environment controller of FIG. 1 is deployed.
Figure 3:
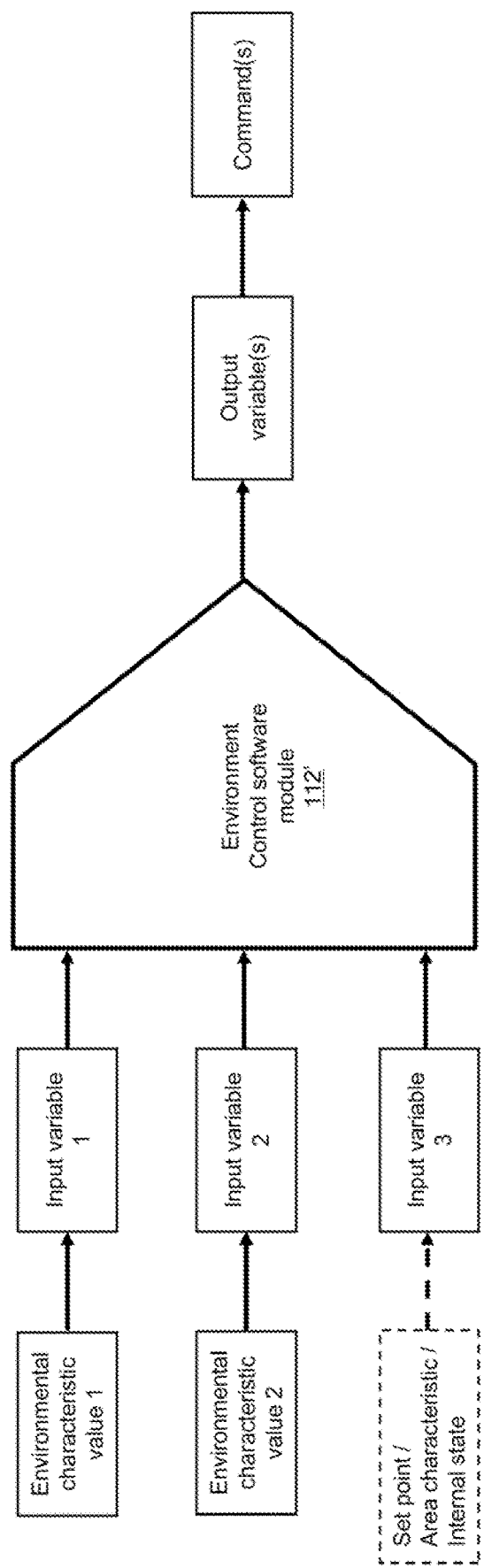
FIG. 3 illustrates an environment control software module executed by the environment controller of FIG. 1.

The dedicated computer program having instructions for implementing the steps of the method 500 is illustrated by the environment control software 112 represented in FIGS. 1 and 2. The terms computer program and software are used interchangeably in the present disclosure. The environment control software module 112' represented in FIG. 3 is a software module of the environment control software 112. The environment control software 112 comprises additional software modules (not represented in the Figures for simplification purposes) interacting with the environment control software module 112' for implementing the steps of the method 500.

Also represented in FIG. 1 are the sensors 200. Although not represented in FIG. 1 for simplification purposes, the sensors 200 comprise at least one sensing module for detecting an environmental characteristic, and a communication interface for transmitting to the environment controller 100 an environmental characteristic value corresponding to the detected environmental characteristic. The environmental characteristic value is transmitted over a communication network and received via the communication interface 130 of the environment controller 100. The sensors 200 may also comprise a processing unit for generating the environmental characteristic value based on the detected environmental characteristic.

FIG. 2 illustrates examples of sensors 200 and corresponding examples of transmitted environmental characteristic value(s). The examples include a temperature sensor 200, capable of measuring a current temperature and transmitting the measured current temperature to the environment controller 100. The examples also include a humidity sensor 200, capable of measuring a current humidity level and transmitting the measured current humidity level to the environment controller 100. The examples further include a carbon dioxide (CO2) sensor 200, capable of measuring a current CO2 level and transmitting the measured current CO2 level to the environment controller 100. The examples also include a room occupancy sensor 200, capable of determining a current occupancy of a room and transmitting the determined current room occupancy to the environment controller 100. The room comprises the sensors 200 and the controlled appliance 300. The environment controller 100 may or may not be present in the room (the environment controller 100 may remotely control the environment of the room, which includes controlling the controlled appliance 300 based on the data transmitted by the sensors 200).

The aforementioned examples of sensors 200 are for illustration purposes only, and a person skilled in the art would readily understand that other types of sensors 200 could be used in the context of an environment control system managed by the environment controller 100. Furthermore, each environmental characteristic value may consist of either a single value (e.g. current temperature of 25 degrees Celsius), or a range of values (e.g. current temperature from 25 to 26 degrees Celsius).

The temperature, humidity and CO2 sensors are well known in the art, and easy to implement types of sensors. With respect to the occupancy sensor, its implementation may be more or less complex, based on its capabilities. For example, a basic occupancy sensor (e.g. based on ultrasonic or infrared technology) is only capable of determining if a room is occupied or not. A more sophisticated occupancy sensor is capable of determining the number of persons present in a room; and may use a combination of camera(s) and pattern recognition software for this purpose. Consequently, in the context of the present disclosure, a sensor 200 shall be interpreted as potentially including several devices cooperating for determining an environmental characteristic value (e.g. one or more camera collaborating with a pattern recognition software executed by a processing unit for determining the current number of persons present in the room).

Also represented in FIG. 1 is the controlled appliance 300. Although not represented in FIG. 1 for simplification purposes, the controlled appliance 300 comprises at least one actuation module, and a communication interface for receiving one or more command from the environment controller 100. The actuation module can be of one of the following type: mechanical, pneumatic, hydraulic, electrical, electronical, a combination thereof, etc. The one or more command controls operations of the at least one actuation module. The one or more command is transmitted over a communication network via the communication interface 130 of the environment controller 100. The controlled appliance 300 may also comprise a processing unit for controlling the operations of the at least one actuation module based on the received one or more command.

FIG. 2 illustrates an example of a controlled appliance 430, consisting of a VAV appliance. Examples of commands transmitted to the VAV appliance 300 include commands directed to one of the following: an actuation module controlling the speed of a fan, an actuation module controlling the pressure generated by a compressor, an actuation module controlling a valve defining the rate of an airflow, etc. This example is for illustration purposes only, and a person skilled in the art would readily understand that other types of controlled appliances 300 could be used in the context of an environment control system managed by the environment controller 100.

A command sent to the controlled appliance 300 shall be interpreted broadly, as comprising the command itself along with zero, one or more parameter. Thus, examples of commands include: set the speed of a fan to 15 revolutions per second, increase the speed of the fan by 5 revolutions per second, decrease the speed of the fan by 10 revolutions per second, stop the rotation of the fan, etc.

The method 500 comprises the step 505 of receiving at least one environmental characteristic value via the communication interface 130. This step is performed by the environment control software 112 executed by the processing unit 110 of the environment controller 100. The environmental characteristic values are received from the sensors 200. In a particular implementation (not represented in FIGS. 1 and 2 for simplification purposes), one or more sensor is directly integrated to the environment controller 100. For these integrated sensors, the environmental characteristic values are transmitted via a communication bus internal to the environment controller 100. The internal communication bus is an additional component of the communication interface 130.

The method 500 comprises the step 510 of determining a plurality of input variables. At least one of the plurality of input variables is based on one among the at least one environmental characteristic value determined at step 505. This step is performed by the environment control software 112 executed by the processing unit 110. FIG. 3 illustrates a first and a second input variable respectively based on environment characteristic values, and a third input variable not based on environment characteristic values. The total number of input variables may vary, as well as the proportion of input variables being based on environment characteristic values.

Examples of the determination of an input variable based on an environmental characteristic value include: simply copying the environmental characteristic value into the input variable, applying a mathematical formula for calculating the input variable based on the environmental characteristic value, etc. An input variable may also by determined based on more than one environmental characteristic value.

Optionally, one or more of the input variables is determined based on a set point provided by a user 10 illustrated in FIG. 1. The user 10 provides at least one set point to the environment controller 100. Examples of set points include target environmental characteristic values, such as a target temperature, a target humidity level, a target CO2 level, a combination thereof, etc. These examples are for illustration purposes only, and a person skilled in the art would readily understand that other types of set points could be used in the context of an environment control system managed by the environment controller 100. Furthermore, each set point may consist of either a single value (e.g. target temperature of 25 degrees Celsius), or a range of values (e.g. target temperature from 25 to 26 degrees Celsius).

The user 10 enters the set point(s) via the user interface 140 of the environment controller 100. Alternatively, the user 10 enters the set point(s) via a user interface of a computing device (e.g. a smartphone, a tablet, etc.) not represented in FIG. 1 for simplification purposes; and the set point(s) is (are) transmitted over a communication network and received via the communication interface 130 of the environment controller 100.

Examples of the determination of an input variable based on a set point include: simply copying the set point into the input variable, applying a mathematical formula for calculating the input variable based on the set point, etc. An input variable may also by determined based on more than one set point.

Optionally, one or more of the input variables is determined based on a characteristic of an area (e.g. room, aisle, floor, etc.) of a building. The environment controller 100, the sensors 200 and the controlled appliance 300 are deployed in the building; but are not necessarily all located in the same area of the building. Area characteristics include one or more geometric characteristic of the area. Examples of geometric characteristics include a volume of the area, a surface of the area, a height of the area, a length of the area, a width of the area, etc. Instead of a given value, the geometric characteristics may be identified as ranges of values. For example, the volume of the area is defined by the following ranges of values: 0 to 50 cubic meters, 50 to 200 cubic meters, and more than 200 cubic meters. Similarly, the height of the area is defined by the following ranges of values: less than 3 meters and more than 3 meters.

Alternatively or complementarity, the characteristics of a current area include an area type identifier of the current area. A plurality of area type identifiers is defined, each area type identifier corresponding to areas having one or more geometric characteristic in common. For example, each area type identifier is an alphanumerical value. The area type identifier of the current area is selected among the plurality of pre-defined area type identifiers based on geometric characteristics of the current area. For instance, the area type identifier R1 is allocated to areas having a volume lower than 50 cubic meters; the area type identifier R2 is allocated to areas having a volume between 50 and 200 cubic meters, and a height lower than 3 meters; the area type identifier R3 is allocated to areas having a volume between 50 and 200 cubic meters, and a height higher than 3 meters; and the area type identifier R4 is allocated to areas having a volume higher than 200 cubic meters.

Alternatively or complementarity, the characteristics of a current area include a human activity in the area. For example, the human activity in the area comprises periods of time when the area is occupied by humans (e.g. during the day or during the night, in the morning or in the afternoon, during the week or the week end, etc.). Alternatively or complementarity, the human activity in the area defines the type of activity performed by the persons occupying the area. For instance, the area is an office room, a room in a store, a storage room, a workshop room, a room in a house or an apartment, etc.

The aforementioned area type identifier of the area can also be based on the human activity in the area. Furthermore, a person skilled in the art would readily understand that other types of area characteristics could be used in the context of an environment control system managed by the environment controller 100.

Each one of the characteristics of an area can be transmitted to the environment controller 100 by another computing device (not represented in FIGS. 1 and 2 for simplification purposes) via the communication interface 130, transmitted by a user 10 via the user interface 140, determined autonomously by the environment controller 100, determined by the environment controller 100 based on data transmitted to the environment controller 100, etc.

Examples of the determination of an input variable based on an area characteristic include: simply copying the area characteristic into the input variable, applying a mathematical formula for calculating the input variable based on the area characteristic, etc. An input variable may also by determined based on more than one area characteristic.

FIG. 3 illustrates the third input variable being based on one of the following: a set point, an area characteristic, and an internal state. An internal state is for example an environmental state previously determined by the environment control software 112 and used during the current iteration of the method 500.

An input variable may also be determined based on a combination of at least two among an environment characteristic value, a set point, an area characteristic and an internal state. However, this type of combination is more complex and is preferably performed by the environment control software module 112' during step 515 of the method 500. Thus, in the general case, an input variable is determined based solely on a single type of data selected among the environment characteristic values, the set points, the area characteristics and the internal states.

The method 500 comprises the step 515 of calculating at least one output variable based on the plurality of input variables determined at step 515. This step is performed by the environment control software 112 executed by the processing unit 110. More specifically, this step is performed by the environment control software module 112' as illustrated in FIG. 3. As mentioned previously, the environment control software module 112' is a software module of the environment control software 112.

A single output variable is represented in FIG. 3 for illustration purposes only, but the environment control software module 112' may generate any number of output variable based on the input variables. The calculation of the output variable(s) by the environment control software module 112' uses a mathematical formula, an algorithm, a rule engine, a combination thereof, etc.; as is well known in the art.

The environment control software 112 may include a plurality of environment control software module 112' (not represented in the Figures for simplification purposes) for calculation output variable(s) based on a plurality of input variables. The output variable (e.g. an environmental state) of an environment control software module 112' can be used as input variable of the same environment control software module 112', or as input variable of another environment control software module 112'.

The method 500 comprises the step 520 of generating one or more command for controlling the controlled appliance 300 based on one or more of the output variable(s). This step is performed by the environment control software 112 executed by the processing unit 110.

FIG. 3 represents a single output variable being used for generating a single command for illustration purposes only. However, a given command may be generated based on a plurality of output variables generated by the environment control software module 112'. Furthermore, the output variables of the environment control software module 112' may be used for generating a plurality of commands. The plurality of commands may be used to control a plurality of controlled appliances 300 or a single control appliance 300.

The method 500 comprises the step 525 of transmitting the command(s) to the controlled appliance 300 via the communication interface 130. This step is performed by the environment control software 112 executed by the processing unit 110.

Figure 6:
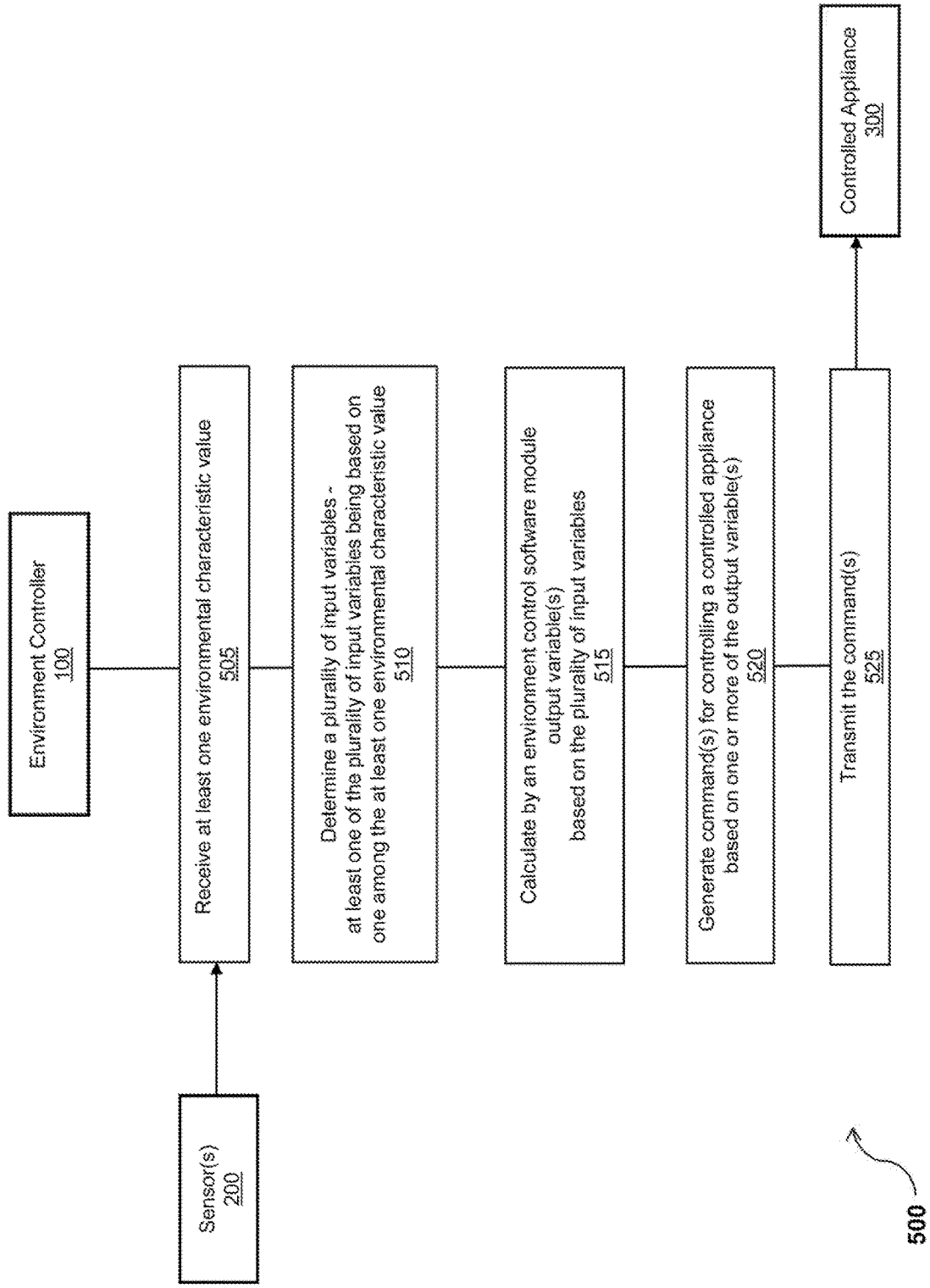
FIG. 6 illustrates an environment control method executed by the environment controller of FIG. 1.

Although not represented in FIG. 6 for simplification purposes, the method 500 comprises the additional step of applying the command(s) by the controlled appliance 300.

Steps 510 to 525 are repeated if a new environmental characteristic value is received at step 505. Furthermore, configurable thresholds can be used for each type of environmental characteristic value received at step 505, so that a change in the value of an environmental characteristic value is not taken into consideration as long as it remains within the boundaries of the corresponding threshold(s). For example, if the environmental characteristic value is a new current temperature received at step 505, the threshold can be an increment/decrease of 1 degree Celsius in the current temperature.

Environment Controller Interfaced with AI Means—Operational Phase

Figure 4:
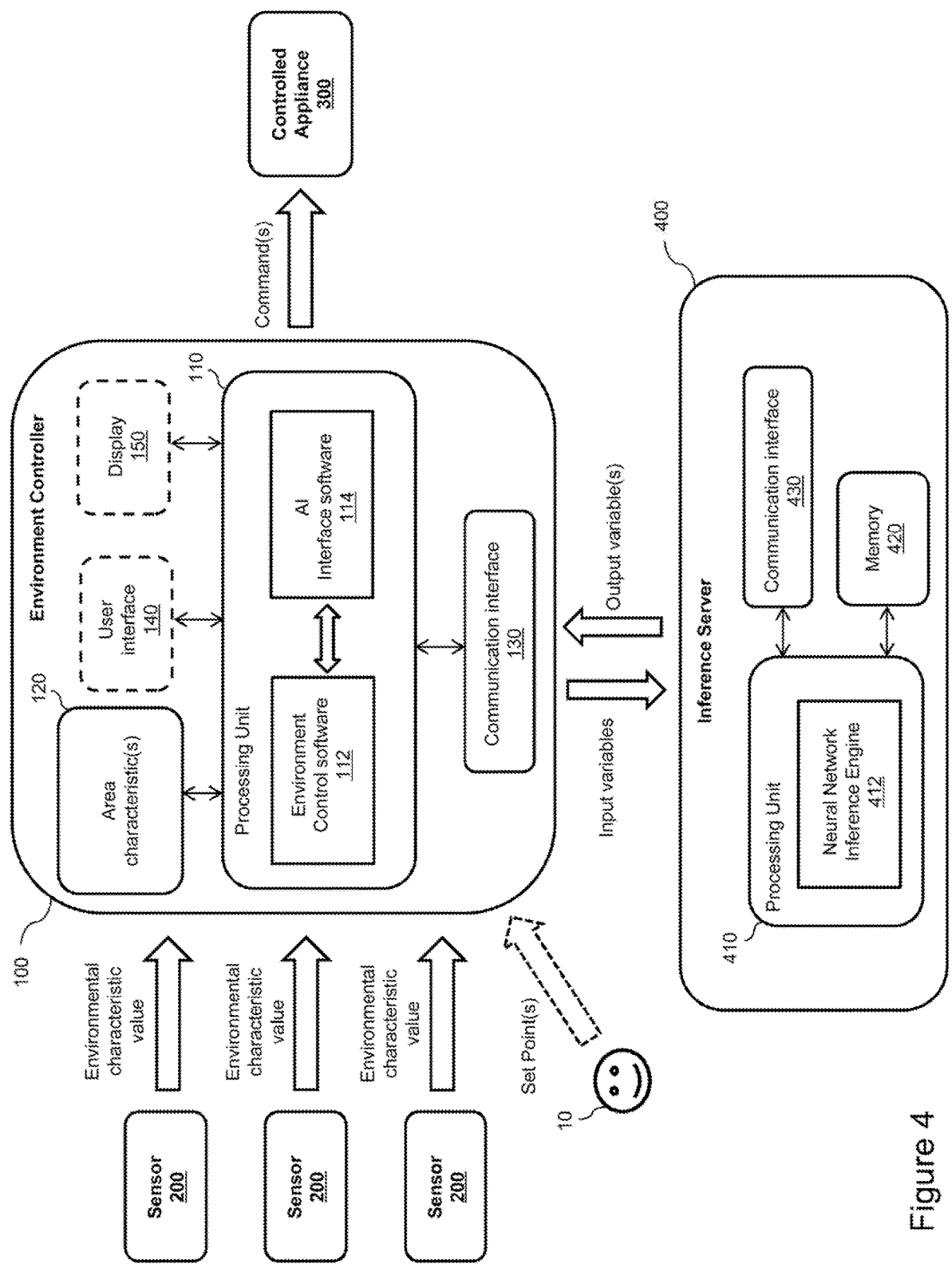
FIG. 4 illustrates the environment controller of FIG. 1 adapted for interacting with an inference server for bypassing the legacy environment control software module of FIG. 3.

Referring now concurrently to FIGS. 4, 5A, 5B, 5C, 6 and 7, the environment controller 100 represented in FIG. 1 has been adapted as illustrated in FIG. 4 for executing a method 600 (represented in FIG. 7) for bypassing the environment control software module 112' represented in FIG. 3.

In this part of the description, the environment control software module 112' is referred to as the legacy environment control software module 112'. The term legacy refers to the fact that the environment control software module 112' was initially deployed on the environment controller 100 for calculating output variable(s) based on a plurality of input variables according to the legacy method 500. However, new AI means (more specifically means using a neural network) have been added to the environment controller 100 for determining the output variable(s) based on the plurality of input variables according to the new method 600. A user of the environment controller 100 has the possibility to configure the environment controller 100 to use either one of the legacy environment control software module 112' (legacy method 500) or the new AI means (new method 600).

The processing unit 110 of the environment controller 100 executes the environment control software 112, which comprises the legacy environment control software module 112'. As mentioned previously, the legacy environment control software module 112' has not been modified.

The processing unit 110 further executes the AI interface software 114, which provides an interface to an inference server 400 via the communication interface 130 of the environment controller 100. The AI interface software 114 comprises an AI control software module 114' which will be detailed in the description of the method 600. The AI interface software 114 may include a single AI control software module 114', a plurality of AI control software modules 114', and additional software modules.

The inference server 400 comprises a processing unit 410, memory 420 and a communication interface 430. The processing unit 410 of the inference server 400 executes a neural network inference engine 412. A predictive model is used by the neural network inference engine 412 for inferring output(s) based on inputs, as is well known in the art of neural networks. The predictive model is stored in the memory 420.

The predictive model is generated by a training server (not represented in FIG. 4 for simplification purposes) executing a neural network training engine (not represented in FIG. 4 for simplification purposes). The training model is transmitted by the training server to the inference server 400; and received via the communication interface 430 for storage in the memory 420. Alternatively, the training server is also executed by the inference server 400 during a training phase for generating the predictive model. The generated predictive model is then directly stored in the memory 420, for usage during an operational phase by the neural network inference engine 412.

The inference server 400 and the environment controller 100 exchange data via their respective communication interfaces 430 and 130 over a communication network. The environment controller 100 transmits input variables to the inference server 400 and the inference server 400 transmits inferred output variable(s) to the environment controller 100, as will be detailed in the description of the method 600.

At least some of the steps of the method 600 are implemented by the environment controller 100, to bypass the legacy environment control software module 112'.

A dedicated computer program has instructions for implementing the steps of the method 600 executed by the environment controller 100. The instructions are comprised in a non-transitory computer program product (e.g. the memory 120) of the environment controller 100. The instructions, when executed by the processing unit 110 of the environment controller 100, provide for bypassing the legacy environment control software module 112'. The instructions are deliverable to the environment controller 100 via an electronically-readable media such as a storage media (e.g. CD-ROM, USB key, etc.), or via communication links (e.g. via a communication network through the communication interface 130).

The dedicated computer program having instructions for implementing the steps of the method 600 comprises at least a portion of the environment control software 112 and at least a portion of the AI interface software 114 (in particular the AI control software module 114').

The method 600 comprises the step 605 of receiving at least one environmental characteristic value via the communication interface 130. This step is performed by the environment control software 112 executed by the processing unit 110 of the environment controller 100. The environmental characteristic values are received from the sensors 200. This step is similar to step 505 of the method 500.

The method 600 comprises the step 610 of determining a plurality of input variables. At least one of the plurality of input variables is based on one among the at least one environmental characteristic value determined at step 605. This step is performed by the environment control software 112 executed by the processing unit 110. This step is similar to step 510 of the method 500. As mentioned previously with reference to the method 500, an input variable can also be based on set point(s), area characteristic(s), internal state(s), etc.

Figure 5A:
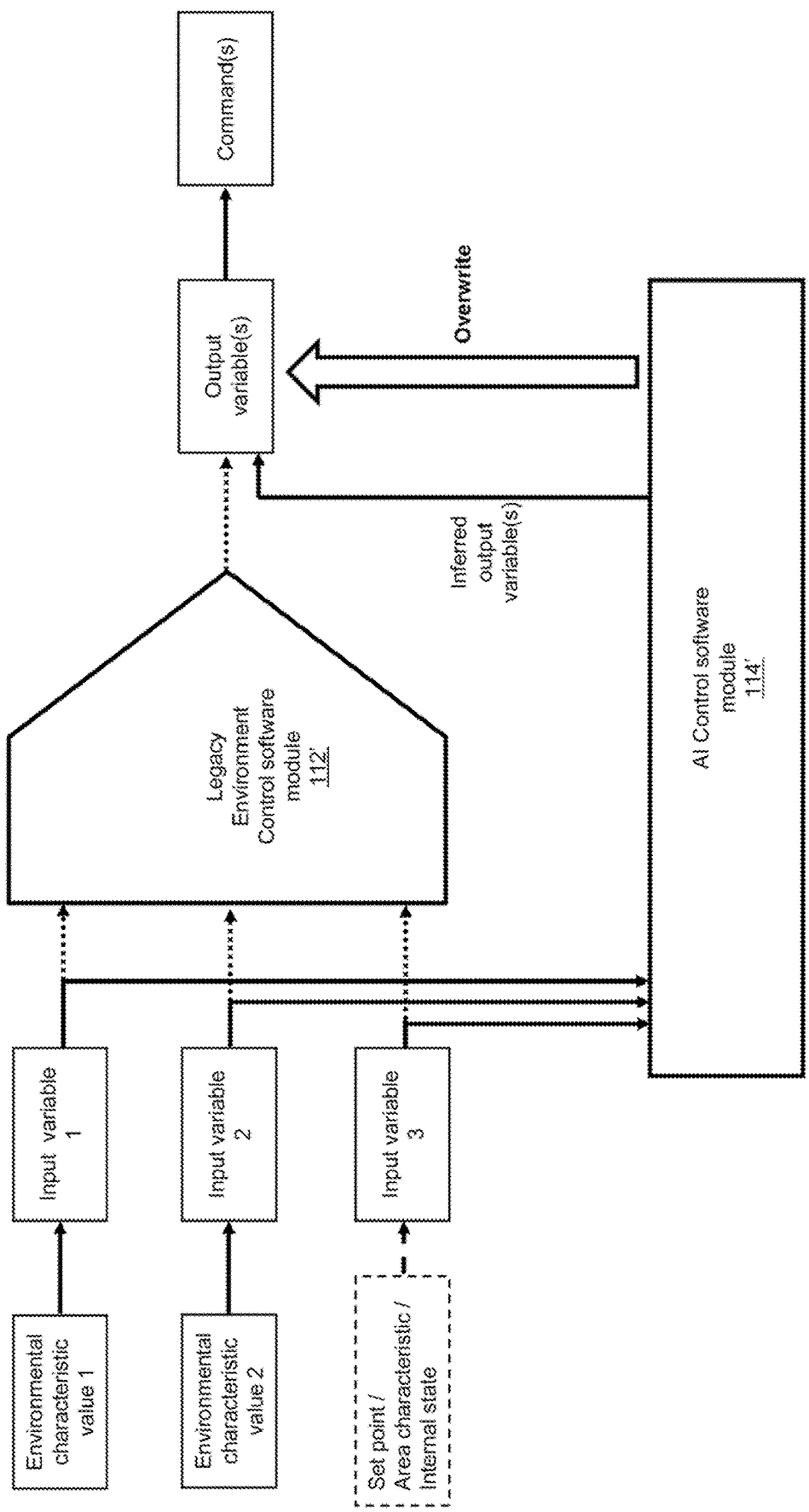
FIGS. 5A, 5B and 5C illustrate an Artificial Intelligence (AI) control software module executed by the environment controller of FIG. 4.
Figure 5B:
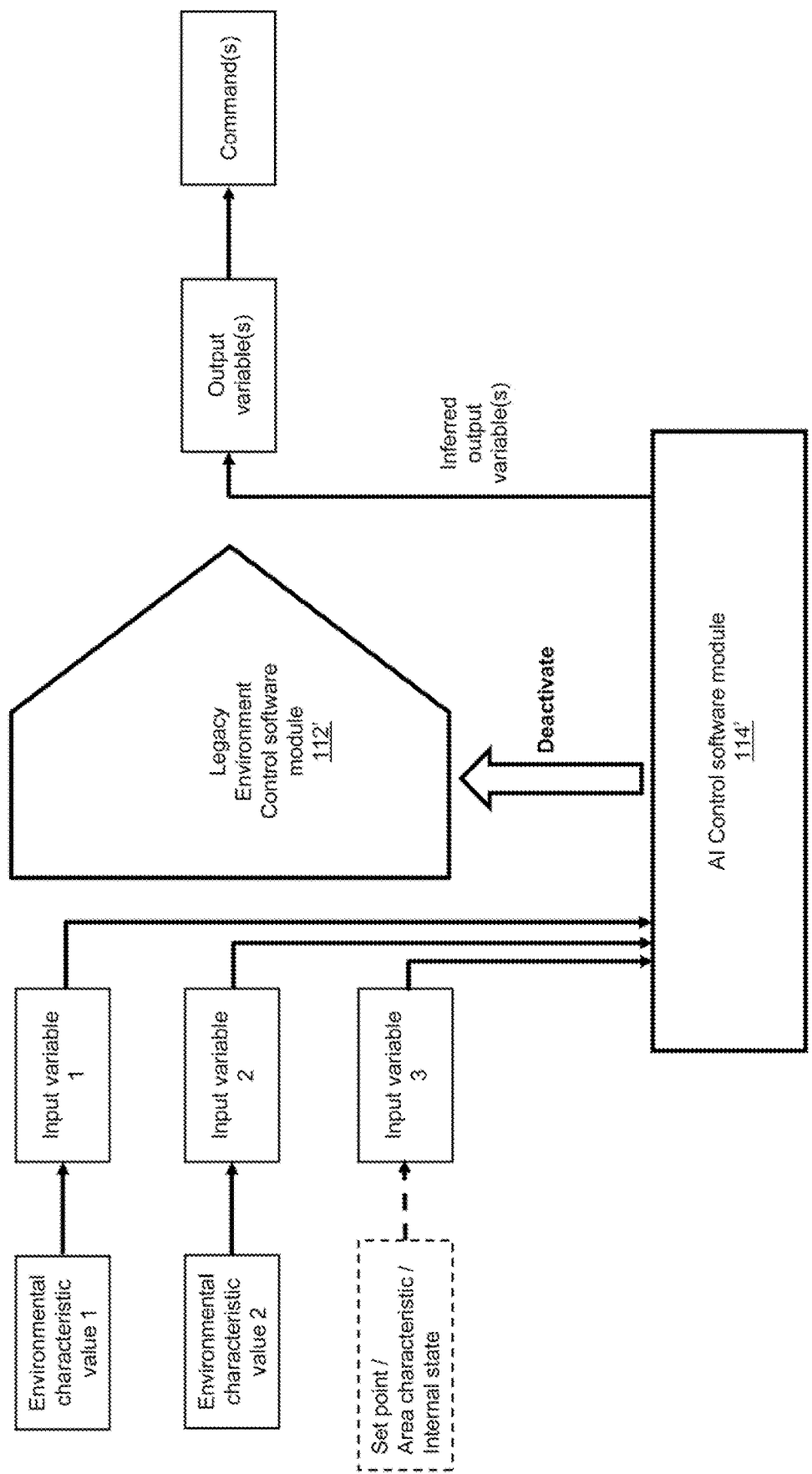
Figure 5C:
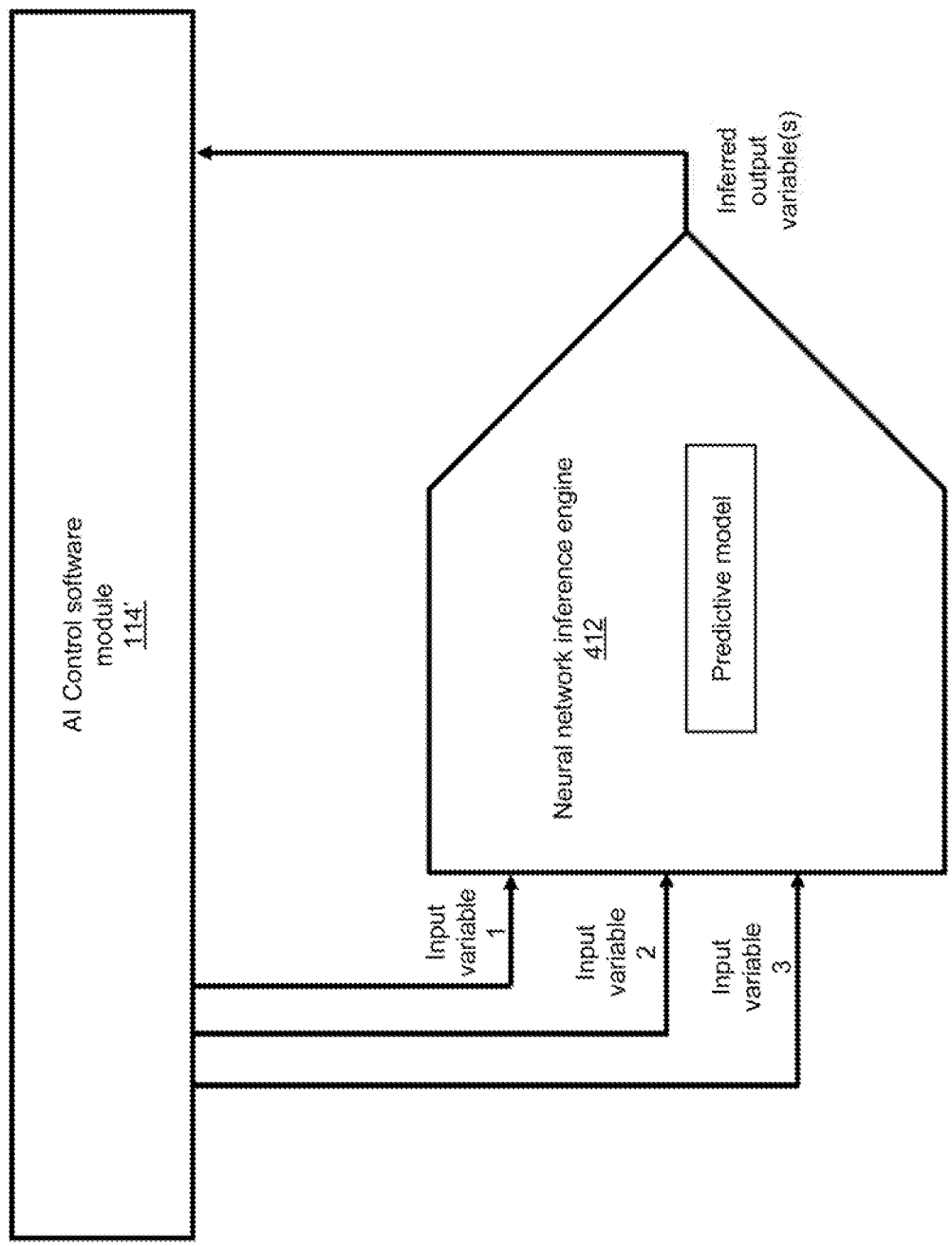

The method 600 comprises the step 615 of transmitting the plurality of input variables (determined at step 610) to the inference server 400 via the communication interface 130. This step is performed by the AI control software module 114' executed by the processing unit 110. This step is illustrated in FIGS. 5A and 5C in a first implementation; and in FIGS. 5B and 5C in a second implementation. These two alternative implementations will be detailed later in the description of the method 600.

The method 600 comprises the step 620 of receiving the plurality of input variables (determined at step 610) at the inference server 400 via the communication interface 430 of the inference server 400. This step is performed by the processing unit 410 of the inference server 400.

The method 600 comprises the step 625 of executing the neural network inference engine 412 using the predictive model stored in the memory 420 of the inference server 400 for generating at least one inferred output variable based on the plurality of input variables received at step 620. This step is performed by the processing unit 410 of the inference server 400. This step is illustrated in FIG. 5C.

The method 600 comprises the step 630 of transmitting the inferred output variable(s) (inferred at step 625) to the environment controller 100 via the communication interface 430. This step is performed by the processing unit 410 of the inference server 400. This step is illustrated in FIG. 5C.

The method 600 comprises the step 635 of receiving the inferred output variable(s) (inferred at step 625) at the environment controller 100 via the communication interface 130. This step is performed by the AI control software module 114' executed by the processing unit 110. This step is illustrated in FIG. 5C.

The method 600 comprises the step 640 of using the at least one inferred output variable received from the inference server 400 by the AI control software module 114', in place of the at least one output variable calculated by the legacy environment control software module 112' based on the plurality of input variables. This step is performed by the environment control software module 112 executed by the processing unit 110. This step corresponds to steps 520 and 525 of the method 500. For example, as illustrated in FIGS. 5A and 5B, one or more commands for controlling the appliance 300 are generated based on one or more of the inferred output variable(s). Thus, the one or more commands are based on output(s) of the neural network inference engine 412 executed by the inference server 400 instead of being based on output(s) of the legacy environment control software module 112'.

FIGS. 5A and 5B illustrate two alternative mechanisms for implementing the method 600. These alternative mechanisms are performed by the AI control software module 114' executed by the processing unit 110. The AI control software module 114' is designed to implement only of the two alternative mechanisms. Alternatively, the AI control software module 114' is designed to implement both of the two alternative mechanisms; and is configured to execute one of the two. These two alternative mechanisms have not been represented in FIG. 7 for simplification purposes. The following paragraphs describe how the two alternative mechanisms integrate with the steps of the method 600.

A first mechanism represented in FIG. 5A consists in executing the legacy environment control software module 112' and overwriting the at least one output variable calculated by the legacy environment control software module 112' with the at least one inferred output variable received from the inference server 400 by the AI control software module 114'.

The execution of the legacy environment control software module 112' for calculating the at least one output variable based on the plurality of input variables is performed in parallel to steps 615 to 635 of the method 600. The overwriting of the at least one calculated output variable (calculated by the legacy environment control software module 112') with the at least one inferred output variable (received from the inference server 400 by the AI control software module 114') is performed after step 635 and before step 640.

A person skilled in the art of software programming would readily understand how to implement this overwriting mechanism. In particular, the implementation shall guarantee that the legacy environment control software module 112' calculates the output variable(s) before the AI control software module 114' overwrites them with the inferred output variable(s).

A second mechanism represented in FIG. 5B consists in preventing the execution of the legacy environment control software module 112'. The AI control software module 114' deactivates the legacy environment control software module 112'. Thus, the legacy environment control software module 112' does not calculate the at least one output variable based on the plurality of input variables. The environment control software module 112 simply uses the at least one inferred output variable (received from the inference server 400 by the AI control software module 114') in place of the at least one calculated output variable (calculated by the legacy environment control software module 112'), as per step 640 of the method 600.

A person skilled in the art of software programming would readily understand how to implement this deactivation mechanism. In particular, the implementation shall guarantee that the timing for deactivating the legacy environment control software module 112' is appropriate (e.g. before or just after step 610).

Furthermore, one way to implement the two aforementioned mechanisms is to allocate dedicated memory spaces in the memory 120 for storing the output variables. The environment control software 112 reads these dedicated memory spaces to retrieve the output variables and perform steps 520 and 525 (generate commands and transmit the generated commands). The legacy environment control software module 112' copies the calculated output variable(s) into the relevant dedicated memory space(s). Similarly, the AI control software module 114' copies the inferred output variable(s) into the relevant dedicated memory space(s); which results in overwriting the calculated values in the case of the first mechanism.

From an implementation perspective, the environment control software 112 needs to be slightly adapted to interface with the new AI interface software 114, but the legacy environment control software module 112' does not need to be modified. Thus, the present disclosure provides means for enhancing the functionalities of the environment controller 100 with AI capabilities without requiring a costly and complicated evolution of the software executed by the environment controller 100. In particular, if the environment controller 100 comprises a plurality of legacy environment control software module 112' for calculating a plurality of commands controlling various types of controlled appliances 300, this plurality of legacy environment control software module 112' do not need to be modified. Additionally, the environment controller 100 can be configured (e.g. by a user via the user interface 140) to use either one of the legacy environment control software module 112' or the new AI functionality, based on specific needs.

If the environment controller 100 comprises a plurality of legacy environment control software module 112', the inference server 400 stores a corresponding plurality of predictive models in the memory 420. Upon execution of the method 600 for bypassing one among the plurality of legacy environment control software module 112', the neural network inference engine 412 uses the predictive model corresponding to the one among the plurality legacy environment control software module 112'.

Figure 8:
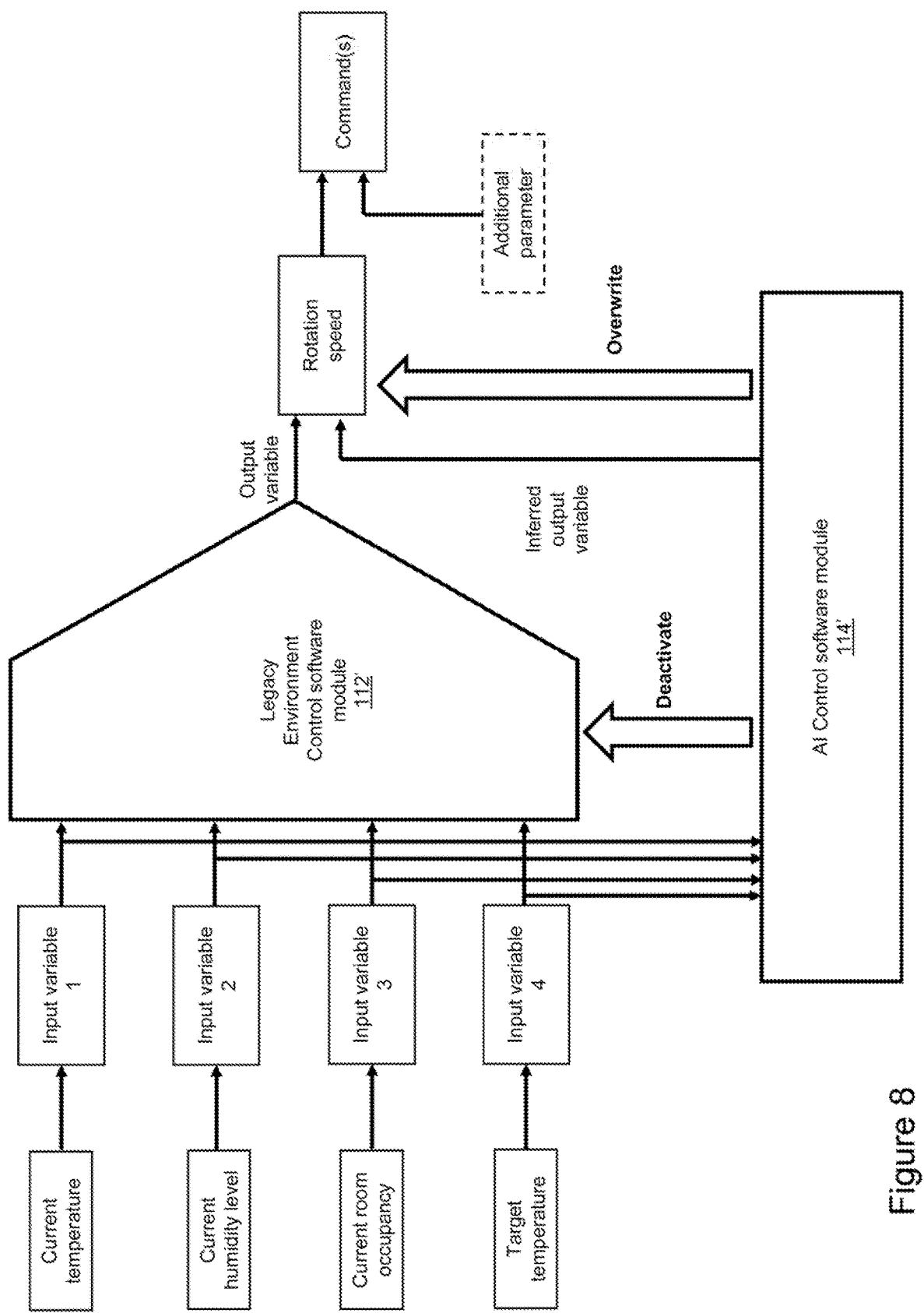
FIG. 8 illustrates the usage of the AI control software module of FIGS. 5A-C for an exemplary use case.

Referring now concurrently to FIGS. 2, 4 and 8, an exemplary use case is illustrated.

The legacy environment control software module 112' has four input variables. The first input variable is based on a current temperature received from a temperature sensor 200. The second input variable is based on a current humidity level received from a humidity sensor 200. The third input variable is based on a current room occupancy received from an occupancy sensor 200. The fourth input variable is based on a target temperature received from a user 10 via the user interface 140.

The output variable calculated by the legacy environment control software module 112' based on the four input variables is the calculated rotation speed of a fan. The inferred output variable generated by the neural network inference engine 412 based on the four input variables is the inferred rotation speed of the fan (inferred via the predictive model stored in the memory 420 of the inference server 400).

A command comprising the rotation speed as a parameter is generated by the environment control software 112. The command is transmitted to the controlled appliance 300 for adjusting the rotation speed of a fan of the controlled appliance 300. The generation of the command may take into account additional parameter(s).

Reference is now made concurrently to FIGS. 4 and 5C.

A proprietary communication protocol may be used for exchanging data between the inference server 400 and the environment controller 100. Although not represented in FIG. 4 for simplification purposes, the inference server 400 may exchange data with a plurality of environment controllers 100, as will be illustrated later in the description in relation to FIG. 9. Alternatively, the inference server 400 executes a web server and each environment controller 100 executes a web client. The exchange of data is based on the Hypertext Transfer Protocol (HTTP) or Hypertext Transfer Protocol Secure (HTTPS) protocol, as is well known in the art.

Alternative AI technologies may be used in place of a neural network. The processing unit 410 of the inference server 400 executes an engine supporting the alternative AI technology in place of the neural network inference engine 412.

In an alternative implementation, the neural network inference engine 412 is executed directly by the processing unit 110 of the environment controller 100. The data exchanged between the AI control software module 114' and the inference engine 412 are internal to the environment controller 100. There is no data exchanged with an inference server 400. The predictive model is stored in the memory 120 of the environment controller 100. This alternative implementation is only possible if the processing power of the processing unit 110 and the memory capacity of the memory 120 are sufficient for supporting the execution of the neural network inference engine 412.

The present disclosure aims at replacing a static technology (the legacy environment control software module 112') by a more dynamic technology (the neural network inference engine 412). The legacy environment control software module 112' is not capable of dealing with a situation (e.g. unexpected values of the input variables) that was not anticipated during the design of the legacy environment control software module 112'. By contrast, the neural network inference engine 412 may still be capable of generating relevant output variable(s) when presented with unexpected values of the input variables.

The robustness of the neural network inference engine 412 depends on the robustness of the predictive model, which is generated during a training phase. During the training phase, a neural network training engine uses a plurality of samples for generating the predictive model. Each sample comprises a given set of input variables and corresponding expected output(s). As is well known in the art of neural networks, during the training phase, the neural network implemented by the neural network training engine adjusts its weights. Furthermore, during the training phase, the number of layers of the neural network and the number of nodes per layer can be adjusted to improve the accuracy of the model. At the end of the training phase, the predictive model generated by the neural network training engine includes the number of layers, the number of nodes per layer, and the weights. The inputs and outputs for the training phase of the neural network can be collected through an experimental process, by collecting data from environment controllers 100 operating in real life conditions.

The neural network training engine has not been represented in the Figures for simplification purposes. The neural network training engine can be executed by the processing unit 410 of the inference server 400. Alternatively, the neural network training engine is executed on a standalone training server; and the generated predictive model is transmitted to the inference server 400.

Following is an example of training data. A first input variable is the current temperature in a room, a second input variable is the current room occupancy, and a third input variable is the target temperature in the room. The output variable is the operating speed of a fan of the controlled appliance 300. The following speeds are available: 5, 10, 15, 20 and 25 revolutions per second.

The neural network training engine is fed with the following combinations of data: [current temperature 30, room occupied by 0 person, target temperature 22, fan speed 15], [current temperature 30, room occupied by 2 persons, target temperature 22, fan speed 20], [current temperature 30, room occupied by 4 persons, target temperature 22, fan speed 25], [current temperature 24, room occupied by 0 person, target temperature 22, fan speed 5], [current temperature 24, room occupied by 2 persons, target temperature 22, fan speed 10], [current temperature 24, room occupied by 4 persons, target temperature 22, fan speed 15], etc.

Various techniques well known in the art of neural networks are used for performing (and improving) the generation of the predictive model, such as forward and backward propagation, usage of bias in addition to the weights (bias and weights are generally collectively referred to as weights in the neural network terminology), reinforcement training, etc.

During the operational phase where the method 600 is executed, the neural network inference engine 412 uses the predictive model (e.g. the values of the weights) determined during the training phase, to infer (at step 625 of the method 600) output variable(s) based on the plurality of input variables, as is well known in the art of neural networks.

Figure 7:
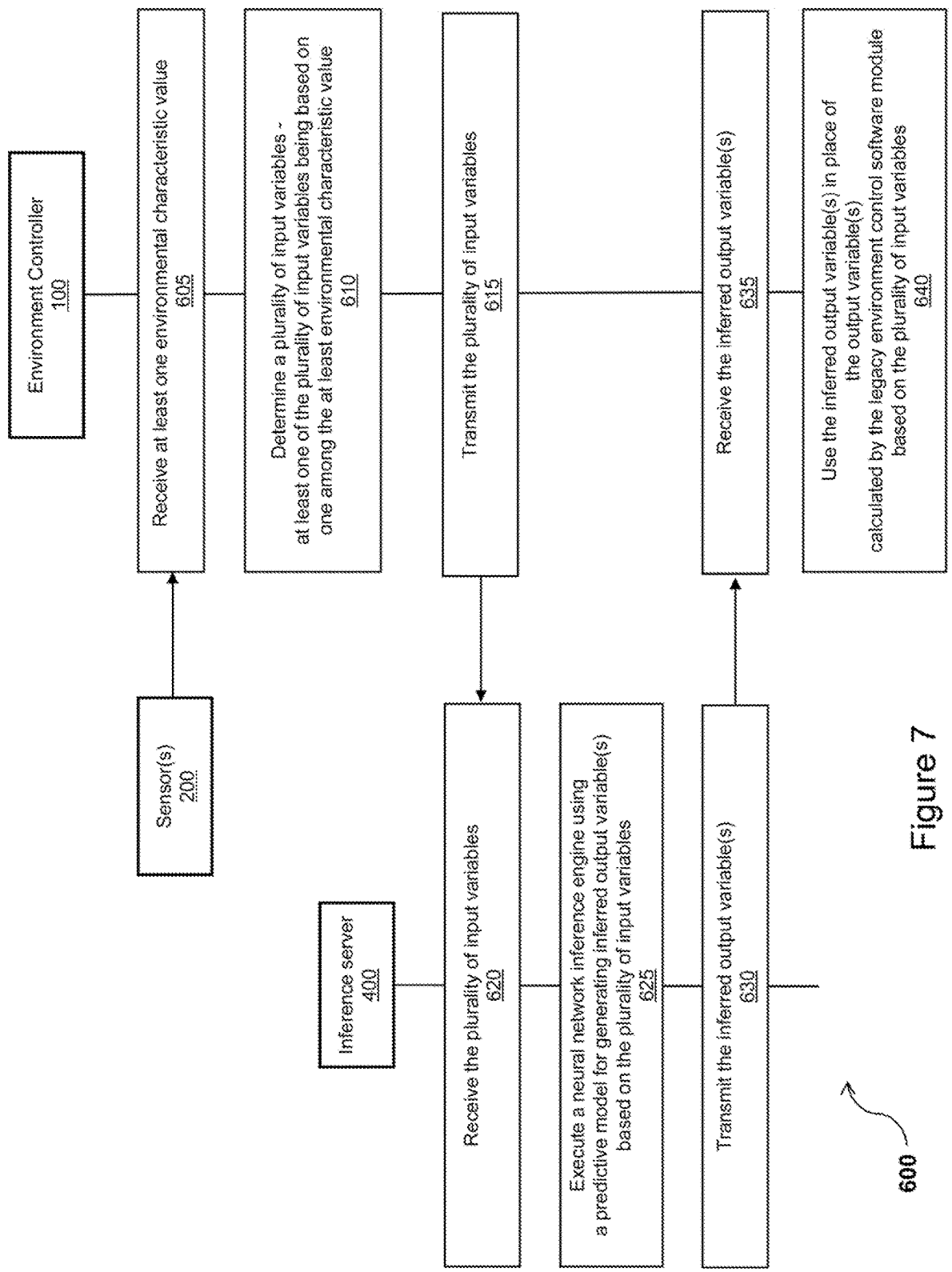
FIG. 7 illustrates a method executed by the environment controller of FIG. 4 for bypassing the legacy environment control software module of FIG. 3.
Figure 9:
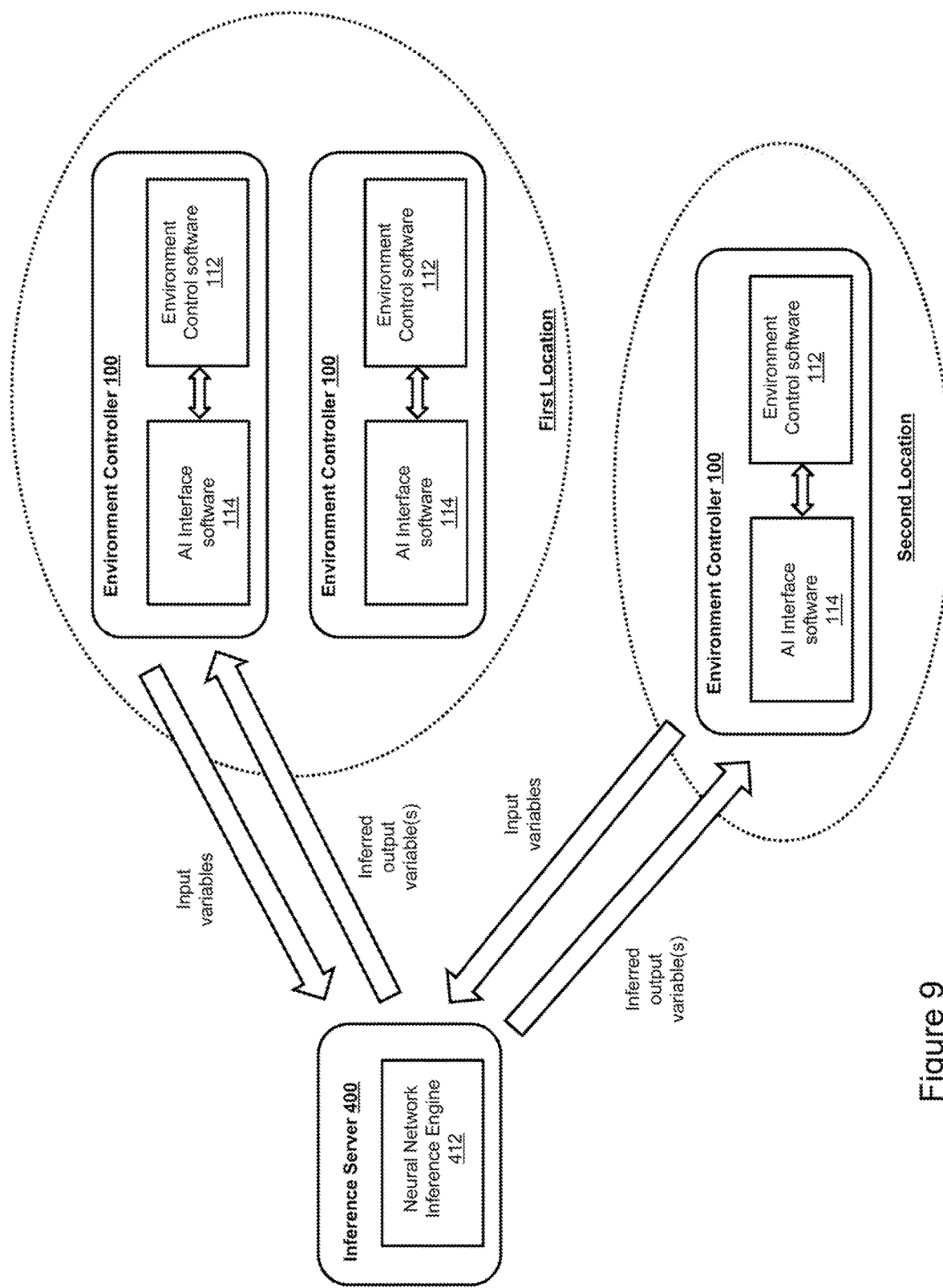
FIG. 9 represents an environment control system where a plurality of environment controllers of FIG. 4 implementing the method of FIG. 7 are deployed.

Reference is now made concurrently to FIGS. 4, 7 and 9, where FIG. 9 illustrates the usage of the method 600 in a large environment control system.

A first plurality of environment controllers 100 implementing the method 600 are deployed at a first location. Only two environment controllers 100 are represented for illustration purposes, but any number of environment controllers 100 may be deployed.

A second plurality of environment controllers 100 implementing the method 600 are deployed at a second location. Only one environment controller 100 is represented for illustration purposes, but any number of environment controllers 100 may be deployed.

The first and second locations may consist of different buildings, different floors of the same building, etc. Only two locations are represented for illustration purposes, but any number of locations may be considered.

The environment controllers 100 correspond to the environment controllers represented in FIG. 4. Each environment controller 100 represented in FIG. 9 interacts with at least one sensor 200 and at least one controlled appliance 300, as illustrated in FIG. 4.

Each environment controller 100 executes both the environment control software 112 and the AI interface software 114. Each environment controller 100 transmits a plurality of input variables to the inference server 400. Each environment controller 100 receives in response one or more inferred output variable from the inference server 400. The inferred output variables are used by the environment controllers 100 for generating commands for controlling the controlled appliances 300.

For instance, a cloud-based inference server 400 is in communication with the environment controllers 100 via a networking infrastructure, as is well known in the art. The inference server 400 executes the neural network inference engine 412 which uses a predictive model. The same predictive model is used by the neural network inference engine 412 for all the environment controllers 100. Alternatively, a plurality of predictive models is used, taking into account specific operating conditions of the environment controllers 100. For example, a first predictive model is used for the environment controllers 100 controlling a first type of appliance 300, and a second predictive model is used for the environment controllers 100 controlling a second type of appliance 300.

FIG. 9 illustrates a centralized architecture, where the environment controllers 100 do not take autonomous decisions for determining the command(s) used for controlling the appliances 300, but generate commands based on the inferred output variables received from the centralized inference server 400.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An environment controller, comprising:
   a communication interface; and
   a processing unit comprising one or more processor for:
      receiving at least one environmental characteristic value via the communication interface;
      determining a plurality of input variables, at least one of the plurality of input variables being based on one among the at least one environmental characteristic value;
      executing a legacy environment control software module, the legacy environment control software module calculating at least one output variable based on the plurality of input variables, the at least one output variable being used by the processing unit for generating one or more command for controlling a controlled appliance based on one or more of the at least one output variable;
      copying the at least one output variable calculated by the legacy environment control software module in one or more dedicated space of a memory of the environment controller;
      transmitting via the communication interface the plurality of input variables to an inference server executing a neural network inference engine;
      receiving via the communication interface at least one inferred output variable from the inference server;
      overwriting the one or more dedicated memory space with the at least one inferred output variable received from the inference server; and
      using the at least one inferred output variable received from the inference server and stored in the one or more dedicated memory space in place of the at least one output variable calculated by the legacy environment control software module for generating the one or more command for controlling the controlled appliance.

2. The environment controller of claim 1, wherein the processing unit further transmits the one or more command to the controlled appliance via the communication interface.

3. The environment controller of claim 1, wherein the environmental characteristic value comprises one of the following: a current temperature, a current humidity level, a current carbon dioxide (CO2) level, and a current room occupancy.

4. The environment controller of claim 1, wherein at least one of the plurality of input variables is based on one of the following: a set point defined by a user, and a characteristic of an area of a building.

5. A method for bypassing a legacy environment control software module via a neural network, the method comprising:

receiving at least one environmental characteristic value via a communication interface of an environment controller;

determining by a processing unit of the environment controller a plurality of input variables, at least one of the plurality of input variables being based on one among the at least one environmental characteristic value;

executing by the processing unit the legacy environment control software module, the legacy environment control software module calculating at least one output variable based on the plurality of input variables, the at least one output variable being used by the processing unit for generating one or more command for controlling a controlled appliance based on one or more of the at least one output variable;

copying by the processing unit the at least one output variable calculated by the legacy environment control software module in one or more dedicated space of a memory of the environment controller;

transmitting by the processing unit via the communication interface the plurality of input variables to an inference server executing a neural network inference engine;

receiving by the processing unit via the communication interface at least one inferred output variable from the inference server;

overwriting by the processing unit the one or more dedicated memory space with the at least one inferred output variable received from the inference server; and using by the processing unit the at least one inferred output variable received from the inference server and stored in the one or more dedicated memory space in place of the at least one output variable calculated by the legacy environment control software module for generating the one or more command for controlling the controlled appliance.

6. The method of claim 5, wherein the processing unit further transmits the one or more command to the controlled appliance via the communication interface.

7. The method of claim 5, wherein the environmental characteristic value comprises one of the following: a current temperature, a current humidity level, a current carbon dioxide (CO2) level, and a current room occupancy.

8. The method of claim 5, wherein at least one of the plurality of input variables is based on one of the following: a set point defined by a user, and a characteristic of an area of a building.

9. The method of claim 5, further comprising executing by a processing unit of the inference server a neural network inference engine using a predictive model for inferring the at least one inferred output variable based on the plurality of input variables.

10. The method of claim 9, wherein the predictive model is stored in a memory of the inference server and comprises weights used by the neural network inference engine.

11. A non-transitory computer program product comprising instructions executable by a processing unit of an environment controller, the execution of the instructions by the processing unit providing for bypassing a legacy environment control software module via a neural network by:

receiving at least one environmental characteristic value via a communication interface of the environment controller;

determining by the processing unit of the environment controller a plurality of input variables, at least one of the plurality of input variables being based on one among the at least one environmental characteristic value;

executing by the processing unit the legacy environment control software module, the legacy environment control software module calculating at least one output variable based on the plurality of input variables, the at least one output variable being used by the processing unit for generating one or more command for controlling a controlled appliance based on one or more of the at least one output variable;

copying by the processing unit the at least one output variable calculated by the legacy environment control software module in one or more dedicated space of a memory of the environment controller;

transmitting by the processing unit via the communication interface the plurality of input variables to an inference server executing a neural network inference engine;

receiving by the processing unit via the communication interface at least one inferred output variable from the inference server;

overwriting by the processing unit the one or more dedicated memory space with the at least one inferred output variable received from the inference server; and using by the processing unit the at least one inferred output variable received from the inference server and stored in the one or more dedicated memory space in place of the at least one output variable calculated by the legacy environment control software module for generating the one or more command for controlling the controlled appliance.

* * * * *